United States Patent [19]

Keithley et al.

[11] 3,987,681

[45] Oct. 26, 1976

[54] CLAMP FOR PRESSES

[75] Inventors: Harry E. Keithley, Battle Creek; Loren G. Harrington, Grand Rapids, both of Mich.

[73] Assignee: Gulf & Western Industrial Products Company, Salem, Ohio

[22] Filed: Aug. 9, 1972

[21] Appl. No.: 279,056

[52] U.S. Cl. .......................... 74/89.15; 74/424.8 R

[51] Int. Cl.$^2$ .......................... F16H 27/02

[58] Field of Search .................. 74/89.15, 424.8, 25, 74/22 R; 89/12, 13; 42/16

[56] References Cited

UNITED STATES PATENTS

| | | | |
|---|---|---|---|
| 2,803,079 | 8/1957 | Heilman | 42/16 |
| 2,849,921 | 9/1958 | Otto | 89/12 |
| 3,046,802 | 7/1962 | Cupedo | 74/22 |
| 3,505,888 | 4/1970 | Denkowski | 74/89.15 |
| 3,766,821 | 10/1973 | Cozzy et al. | 89/13 R |

*Primary Examiner*—Samuel Scott
*Assistant Examiner*—Wesley S. Ratliff, Jr.
*Attorney, Agent, or Firm*—Meyer, Tilberry & Body

[57] ABSTRACT

A clamping device for use on presses has an elongated clamping rod. Exterior threads on one end portion of the rod are threaded into internal threads on a rotatable drive sleeve. Selective driving of the sleeve in opposite directions selectively moves the rod into or out of the sleeve for extending and retracting the rod.

9 Claims, 3 Drawing Figures

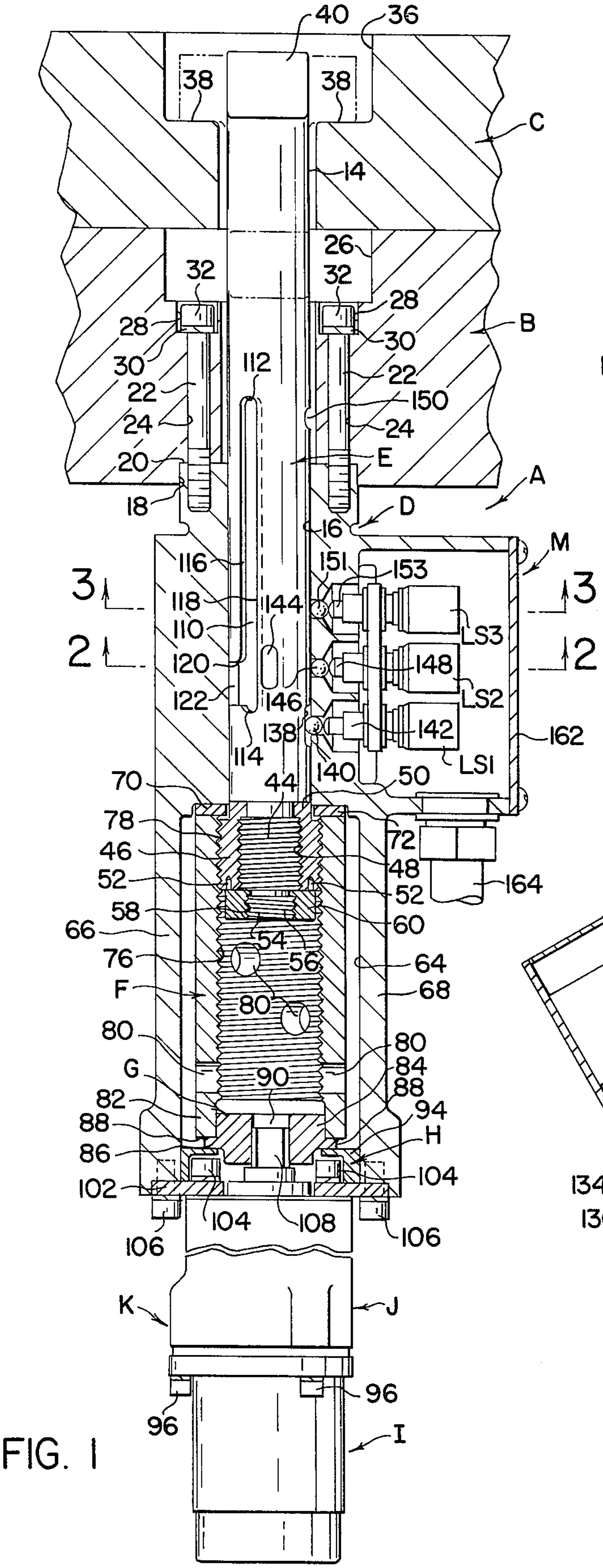
FIG. 1
FIG. 2
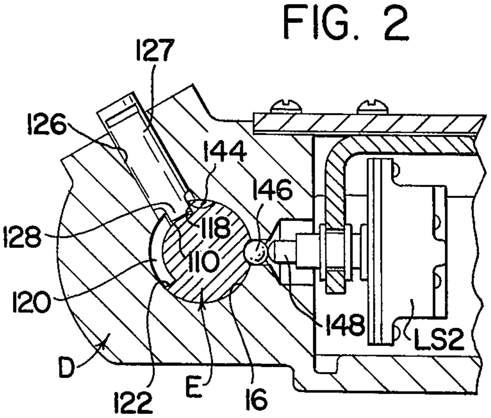
FIG. 3
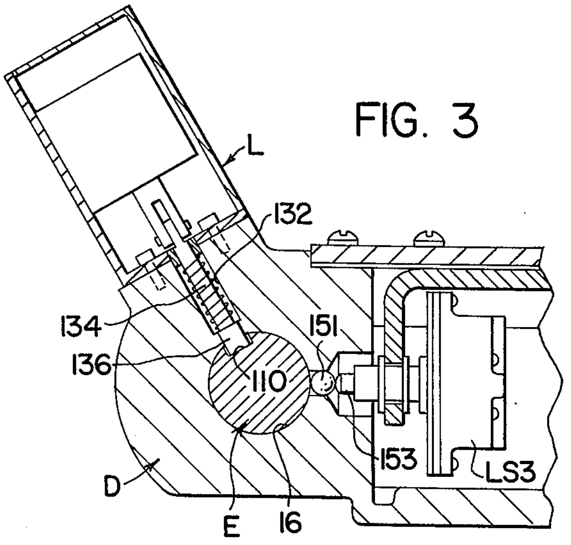

CLAMP FOR PRESSES

BACKGROUND OF THE INVENTION

This application relates to clamping devices and more particularly to clamping devices for use on presses. The invention is particularly applicable for use in clamping dies in a press, and will be particularly described with respect thereto. However, it will be recognized that the invention has broader applications and may be used for clamping other things.

Clamping devices of a known type for use in presses include an elongated clamping rod mounted for rotatable and axial movement in a bore formed in a housing. One end of the rod has a clamping member thereon exteriorly of the bore and the other end portion has an adjustment nut for moving the rod into final clamping engagement. One such clamping device of this type is shown in U.S. Pat. No. 3,111,895 to Kraft, and particularly FIG. 6 of that patent. In previous arrangements of the type described, the rod must undergo considerable axial movement before it is in a clamping position. In previous arrangements, fluid pressure was relied upon for a major portion of this axial movement. The use of fluid pressure required that the rod be manufactured with close tolerances for a tight fit within the bore, and seals are required so that a portion of the rod can act as a piston when fluid pressure is introduced into the bore. Final clamping movement of the prior devices was accomplished by rotating a nut threaded onto the other threaded end portion of the rod. Movement of the rod with the threaded nut arrangement is very limited in previous devices.

It would be desirable to construct a clamping device of the type described which maintains maximum axial movement while eliminating the need for seals and fluid pressure to accomplish maximum axial movement.

SUMMARY OF THE INVENTION

A clamping device of the type described has exterior threads on its other end portion. The exterior threads are threadedly engaged with interior threads on an elongated rotatable drive sleeve axially aligned with the rod. Selective rotation of the drive sleeve in opposite directions threads the other end portion of the rod into or out of the sleeve for accomplishing maximum movement of the rod.

It is a principal object of the present invention to construct an improved clamp for presses which is more economical to manufacture and assemble.

It is also an object of the present invention to provide an improved clamp for presses which eliminates the need for fluid seals or the like.

It is an additional object of the invention to provide an improved clamp for presses which accomplishes all of its movement through a mechanical drive arrangement and eliminates the need for fluid pressure.

BRIEF DESCRIPTION OF THE DRAWING

The invention may take form in certain parts and arrangement of parts, a preferred embodiment of which will be described in detail in this specification and illustrated in the accompanying drawing which forms a part hereof.

FIG. 1 is an elevational view of an improved clamping device constructed in accordance with the present invention with portions cut away and in sections for clarity of illustration;

FIG. 2 is a cross-sectional plan view looking generally in the direction of arrows 2—2 of FIG. 1; and FIG. 3 is a cross-sectional plan view looking generally in the direction of arrows 3—3 of FIG. 1.

DESCRIPTION OF THE PREFERRED EMBODIMENT

Referring now to the drawings, wherein the showings are for purposes of illustrating a preferred embodiment of the invention only and not for purposes of limiting same, FIG. 1 shows an improved clamping device A constructed in accordance with the present invention. Clamping device A is mountable on a bottom bolster B of a press for securing a die mounting adaptor plate C to bolster B.

Bolster B and adaptor plate C have axially aligned substantially rectangular holes 12 and 14 therethrough.

An elongated housing D has a bore 16 therethrough for rotatably and slidably receiving elongated clamping rod E. The lower portion of bolster B is recessed as at 18 for receiving a short upper portion of housing D. Upper end portion 20 of housing D is suitably threaded for receiving bolts 22 which extend through holes 24 in bolster B. The upper portion of bolster B is provided with an enlarged recess 26 in alignment with hole 12 for providing access to bolts 22. The upper portions of bolt holes 24 are enlarged as at 28 so that lock washers 30 and enlarged bolt heads 32 are countersunk below recess 26. The upper portion of adaptor plate C is also provided with an enlarged circular recess 36 to provide shoulders 38 extending at right angles to the long dimension of rectangular hole 14 so that a T-shaped clamping member 40 on one end portion of rod E may be rotated to the shadow line position shown in FIG. 1 for clamping against shoulders 38 to hold adaptor plate C to bolster B.

The other end portion of clamping rod E, opposite from clamping member 40, has a drive means thereon outside of bore 16 for moving rod E rotatably and axially relative to housing D within bore 16. In one arrangement, this drive means includes an exteriorly threaded portion 44 on the other end portion of rod E outside of bore 16. A nut 46 having interior threads 48 is threadedly engaged on threads 44. Nut 46 is tightly threaded on the other end portion of rod E and butts against a shoulder 50 on the other end portion of rod E. Nut 46 may have circumferentially spaced axial bores 52 therein for receiving a spanner wrench to rotate nut 46. Threads 44 and 48 on the other end portion of rod E and nut 46 are right-hand threads so that clockwise rotation of nut 46 will thread nut 46 tightly onto the other end portion of shaft E. The terminal portion of rod E is of a smaller diameter as at 54 and has exterior left-hand threads 56 thereon for cooperation with internal left-hand threads 58 on lock nut 60. Rotation of nut 60 counterclockwise will thread nut 60 tightly onto end portion 54 of rod E for locking nut 46 in position on threads 44 against rotational and axial movement relative to rod E.

The lower end portion of housing D has an enlarged opening 64 therein axially aligned with the longitudinal axis of bore 16. The lower portion of housing D is open as at 66 and 68 for providing lateral access to opening 64. Enlarged opening 64 intersects bore 16 at a circumferential shoulder 70 against which a thrust washer 72 is suitably secured as by screws extending through thrust washer 72 into suitable threaded holes in housing D.

A cylindrical drive sleeve F is rotatably positioned within enlarged opening 64 of housing D for selective rotation in opposite directions. Drive sleeve F has internal right-hand threads 76 extending substantially throughout the entire length thereof. Nut 46 has exterior right-hand threads 78 threadedly engaged with internal threads 76 of elongated drive sleeve F. Drive sleeve F may have a plurality of axially and circumferentially spaced holes 80 laterally therethrough for receiving a rod which may be extended into enlarged opening 64 through lateral opening 66 to manually rotate elongated drive sleeve F in the event of jamming.

The lower end portion of elongated drive sleeve F has a circumferential flange 82 within which a circular portion 84 of a drive member G is received. Drive member G has a lower outwardly extending circumferential flange 86 which is welded to the terminal end of flange 82 as at 88. Drive member G has a centrally located non-circular rectangular hole 90 therein in axial alignment with the longitudinal axis of elongated drive sleeve F and rod E. A cylindrical drive sleeve spacer H is received within enlarged circular opening 64, and secured to drive member G by suitable screws extending axially through flange 94 into threaded engagement with suitable threaded holes in flange 86.

A conventional reversible air motor I is attached to a gear unit J as by bolts 96. Air motor I and gear unit J together define a power means K for selectively rotating elongated drive sleeve F in opposite directions. A mounting ring 102 is secured to the upper end portion of housing J by bolts 104. Mounting ring 102 is secured to the bottom portion of housing D by bolts 106. This mounts power means K to the lower end portion of housing D. Power means K has a rotatable non-circular rectangular drive shaft 108 extending axially therefrom for reception in drive socket 90.

Rod E has an elongated slot 110 formed in its exterior surface and extending longitudinally thereof. Slot 110 has one end portion 112 located toward one end portion of rod E having clamping member 40 thereon. Slot 110 has another end portion 114 located toward the other end portion of rod E having the drive means defined by nut 46 thereon. Slot 110 further has spaced-apart substantially parallel side walls 116 and 118. A circumferential groove 120 is formed in the exterior surface of rod E and intersects slot 110 adjacent end portion 114 thereof. Circumferential groove 120 has one side wall 122 and its opposite side wall is defined by one side wall 118 of slot 110.

Housing D has a lateral bore 126 therein intersecting bore 16. A holding guide pin 127 extends through bore 126 and has an end portion 128 projecting into bore 16 for reception in elongated slot 110. Guide pin 127 may simply be a bolt threaded into bore 126. The arcuate distance between one side wal 118 of slot 110 and side wall 122 of groove 120 is substantially equal to 90° plus one half the transverse width of end portion 128 of pin 127. With this arrangement, rod E may be rotated substantially 90° from the position shown in FIG. 2 until wall 122 of groove 120 strikes the opposite side of end portion 128 on pin 127. End portion 128 on pin 127 has a width dimension measured axially of rod E which is substantially less than the width of groove 120 as measured axially of rod E. This allows for adjustments so that tolerances do not have to be extremely close.

Housing D has another transverse bore 132 formed therein and intersecting bore 16. A solenoid unit L is mounted to the exterior of housing D and has a rod 134 extending through bore 132. Rod 134 has an end portion 136 selectively extensible into or out of bore 16 for positioning end portion 136 in or out of elongated slot 110.

The exterior surface of rod E has a first recess 138 therein for receiving a ball 140 which cooperates with actuator 142 of limit switch LS1. The exterior surface of rod E has a second recess 144 therein circumferentially spaced substantially 90° from recess 138 and positioned toward one end portion of rod E having clamping member 40 thereon from recess 138. Recess 144 cooperates with a ball 146 which acts against an actuator 148 of limit switch LS2. The exterior surface of rod E has an additional recess 150 thereon longitudinally aligned with recess 138 and based toward one end portion of rod E having clamping member 40 thereon.

Locking pin 134 cooperates with elongated groove 110 to hold rod E against rotational movement relative to housing D until holding guide pin 127 is properly located relative to circumferential groove 120.

In its clamping position, elongated rod E is extended upwardly out of housing D and clamping member 40 is in the shadow line position. Rod E is rotated so that side wall 122 of circumferential groove 120 is against end portion 128 of holding guide pin 127. To perform an unclamping operation, a manual switch is thrown to energize air motor I of power drive means K. This rotates elongated drive sleeve F in a counterclockwise direction which tends to move nut 46 upwardly out of drive sleeve F and disengage locking member 40 from firm engagement with shoulders 38 on adaptor C. Locking pin 134 has its end portion 136 simply bearing against the outer periphery of rod E. Continued clockwise rotation of drive sleeve F will then rotate elongated clamping rod E counterclockwise with circumferential groove 120 moving relative to holding guide pin 127 until side wall 118 of elongated slot 110 strikes against the opposite side of end portion 128 on holding guide pin 127. End portion 136 of locking pin 134 will also drop into elongated slot 110. Once this 90° rotation has been accomplished, T-shaped clamping member 40 will be in the solid line position shown in FIG. 1 so that it can be retracted through rectangular opening 14. With clamping member 40 in the solid line position shown in FIG. 1, ball 140 will also drop into recess 138 to energize limit switch LS1. Energization of limit switch LS1 reverses air motor I so that power drive means K rotates in a clockwise direction for rotating elongated drive sleeve F in a clockwise direction to thread nut 46 in a direction toward the bottom of drive sleeve F for retracting rod E. Locking pin 134 holds rod E against rotation because holding guide pin 127 is still aligned with circumferential groove 120. Elongated rod E is then withdrawn axially until clamping member 40 on one end portion thereof is received in recess 26 of bolster B. At this time, ball 151 drops into recess 150 on rod E to free plunger 153 and energize limit switch LS3. Energization of limit switch LS3 shuts off air motor I to stop the device.

For a reverse operation, to extend rod E from housing D to its clamping position, rod E is fully retracted with nut. 60 substantially bottomed out against drive member G in the bottom of elongated drive sleeve F. A switch is thrown to energize air motor I for rotatably driving power drive means K in a counterclockwise direction. Lock pin 134 and holding guide pin 127 are located in slot 110 adjacent end portion 112 thereof to prevent rotation of rod E. Counterclockwise rotation of drive sleeve F causes nut 46 to move axially upward relatively therethrough for extending locking member 40 from its position within recess 26 upwardly through rectangular opening 14 to the solid line position shown in recess 36. Rod E advances until ball 140 drops into recess 138 on rod E to energize limit switch LS1. Energization of limit switch LS1 reverses the driving direction of air motor I and also energizes solenoid L to retract lock pin 134 from engagement with elongated slot 110. Air motor I then rotates to drive power drive means K in a clockwise direction so that elongated drive sleeve F also rotates in a clockwise direction. When ball 140 drops into recess 138, holding guide pin 127 is aligned with circumferential groove 120. Continued rotation of drive sleeve F in a clockwise direction with locking pin 134 retracted then causes rod E to rotate clockwise substantially 90° so that locking member 40 is in the shadow line position shown in FIG. 1 within recess 36. Circumferential groove 120 moves past holding guide pin 127 until wall 122 of groove 120 strikes against end portion 128 of holding guide pin 127. Air motor I continues to operate for withdrawing rod E and bringing locking member 40 into firm clamping engagement against shoulders 38 of recess 36. Air motor I continues to operate until stalled. When rod E rotates through 90° so that locking member 40 is in the shadow line position within recess 36, ball 146 drops into recess 144 to energize limit switch LS2. Energization of limit switch LS2 sends a signal indicating to the operator that the device is in its clamping position.

Limit switches LS1 and LS2 and LS3 are enclosed within a box M provided on housing D which is normally closed by cover plate 162. Electrical connections are made to the switches through a conduit 164 in a known manner.

Although the invention has been described with reference to a preferred embodiment, it is obvious that equivalent alterations and modifications will occur to others skilled in the art upon the reading and understanding of this specification. The present invention includes all such equivalent alterations and modifications and is limited only by the scope of the claims.

Having thus described our invention, we claim:

1. A clamping device for use on presses comprising, a housing having a bore therethrough, an elongate clamping rod in said bore, said rod being rotatable in opposite directions relative to said bore and axially reciprocable relative thereto, said rod having opposite ends and clamping means on one of said ends, guide means between said housing and rod guiding reciprocation of said rod relative to said bore along a generally linear path between extended and retracted positions relative to said bore and guiding rotation of said rod relative to said bore along a circumferential path at said extended position and between a first circumferential rod position circumferentially coinciding with said linear path and a second circumferential rod position circumferentially spaced from said linear path less than 360°, drive means on the other of said opposite ends of said rod, said drive means including external thread means on said rod and internally threaded sleeve means threadedly engaged with said external thread means, means supporting said sleeve means for rotation relative to said housing and against axial displacement relative to said bore, means for rotating said sleeve means in opposite directions, and means for controlling said means for rotating said sleeve means to achieve, in sequence, linear movement of said clamping rod from said retracted to said extended position of said rod, rotation of said rod in said extended position and in one circumferential direction from said first to said second circumferential rod position, rotation of said rod in said extended position and in the opposite circumferential direction from said second to said first circumferential rod position, said linear movement of said rod from said extended to said retracted position of said rod.

2. The device of claim 1, wherein said guide means includes a first slot in and extending longitudinally of said rod along said linear path and having opposite ends corresponding to said extended and retracted positions, a second slot in said rod and extending circumferentially from said first slot at the end thereof corresponding to said extended position, said second slot having an end circumferentially spaced from said first slot and corresponding to said second circumferential position of said rod, and guide pin means mounted on said housing and extending into said bore, said pin means having an end portion received in said first slot and cooperable therewith to hold said rod against rotation during movement of said rod between said extended and retracted positions, and said end portion of said pin means being axially aligned with said second slot when said rod is in said extended position so that said rod may rotate relative to said pin means to said second circumferential position.

3. A clamping device for use on presses comprising, a housing having a bore therethrough, an elongate clamping rod in said bore and rotatable and axially reciprocable relative thereto, said rod having opposite ends and clamping means on one of said ends, guide means between said housing and rod guiding reciprocation of said rod relative to said bore along a generally linear path between extended and retracted positions relative to said bore and guiding rotation of said rod relative to said bore along a circumferential path at said extended position and between a first circumferential position at said linear path and a second circumferential position circumferentially spaced from said linear path less than 360°, drive means on the other of said opposite ends of said rod, said drive means including external thread means on said rod and internally threaded sleeve means threadedly engaged with said external thread means, means supporting said sleeve means for rotation relative to said housing and against axial displacement relative to said bore, means for rotating said sleeve means in opposite directions, means for controlling said means for rotating said sleeve means to achieve sequential movement of said clamping rod between said retracted, extended and second circumferential positions and between said second circumferential, extended and retracted positions, said guide means including a first slot in and extending longitudinally of said rod along said linear path and having opposite ends corresponding to said extended and retracted positions, a second slot in said rod and extending circumferentially from said first slot at the end thereof corresponding to said extended position, said second slot having an end circumferentially spaced from said first slot and corresponding to said second circumferential position of said rod, and guide pin means mounted on said housing and extending into said bore, said pin means having an end portion received in said first slot and cooperable therewith to hold said rod against rotation during movement of said rod between said extended and retracted positions, and said end portion of said pin means being axially aligned with said second slot when said rod is in said extended position so that said rod may rotate relative to said pin means to said second circumferential position, and locking pin means mounted on said housing, said locking pin means being extendable and retractable relative to said first slot, said locking pin means being cooperable with said first slot in the extended position of said locking pin means to hold said rod against rotation during movement of said rod from the extended toward the retracted position thereof.

4. The device of claim 1, wherein said means for rotating said sleeve means includes a reversible drive motor, said means for controlling said means for rotating said sleeve means including means for sensing axial and circumferential positions of said clamping rod relative to said bore, and means responsive to said sensing means to control directional operation of said drive motor.

5. A clamping device for use on presses comprising, a housing having a bore therethrough, an elongate clamping rod in said bore and rotatable and axially reciprocable relative thereto, said rod having opposite ends and clamping means on one of said ends, guide means between said housing and rod guiding reciprocation of said rod relative to said bore along a generally linear path between extended and retracted positions relative to said bore and guiding rotation of said relative to said bore along a circumferential path at said extended position and between a first circumferential position at said linear path and a second circumferential position circumferentially spaced from said linear path less than 360°, drive means on the other of said opposite ends of said rod, said drive means including external thread means on said rod and internally threaded sleeve means threadedly engaged with said external thread means, means supporting said sleeve means for rotation relative to said housing and against axial displacement relative to said bore, means for rotating said sleeve means in opposite directions, means for controlling said means for rotating said sleeve means to achieve sequential movement of said clamping rod between said retracted, extended and second circumferential positions and between said second circumferential, extended and retracted positions, said means for rotating said sleeve means including a reversible drive motor, said means for controlling said means for rotating said sleeve means including means for sensing axial and circumferential positions of said clamping rod relative to said bore, and means responsive to said sensing means to control directional operation of said drive motor, said sensing means including recesses in said rod at locations corresponding to said extended and retracted positions of said rod and operator means positioned in said bore to enter the corresponding recess when said rod is in each of said positions, and said means responsive to said sensing means including motor control switch means for each operator means.

6. A clamping device for use on presses comprising, a housing having a bore therethrough, an elongate clamping rod in said bore and rotatable and axially reciprocable relative thereto, said rod having opposite ends and clamping means on one of said ends, guide means between said housing and rod guiding reciprocation of said rod relative to said bore along a generally linear path between extended and retracted positions relative to said bore and guiding rotation of said rod relative to said bore along a circumferential path at said extended position and between a first circumferential position at said linear path and a second circumferential position circumferentially spaced from said linear path less than 360°, drive means on the other of said opposite ends of said rod, said drive means including external thread means on said rod and internally threaded sleeve means threadedly engaged with said external thread means, means supporting said sleeve means for rotation relative to said housing and against axial displacement relative to said bore, means for rotating said sleeve means in opposite directions, means for controlling said means for rotating said sleeve means to achieve sequential movement of said clamping rod between said retracted, extended and second circumferential positions and between said said second circumferential, extended and retracted positions, said means for rotating said sleeve means including a reversible drive motor, said means for controlling said means for rotating said sleeve means including means for sensing axial and circumferential positions of said clamping rod relative to said bore, and means responsive to said sensing means to control directional operation of said drive motor, said guide means including a first slot in and extending longitudinally of said rod along said linear path and having opposite ends corresponding to said extended and retracted positions, a second slot in said rod and extending circumferentially from said first slot at the end thereof corresponding to said extended position, said second slot having an end circumferentially spaced from said first slot and corresponding to said second circumferential position of said rod, and guide pin means mounted on said housing and extending into said bore, said pin means having an end portion received in said first slot and cooperable therewith to hold said rod against rotation during movement of said rod between said extended and retracted positions, and said end portion of said pin means being axially aligned with said second slot when said rod is in said extended position so that said rod may rotate relative to said pin means to said second circumferential position.

7. The device of claim 6, and further including locking pin means mounted on said housing, said locking pin means being extendable and retractable relative to said first slot, said locking pin means being cooperable with said first slot in the extended position of said locking pin means to hold said rod against rotation during movement of said rod from the extended toward the retracted positions thereof.

8. The device of claim 7, and further including solenoid motor means operable when energized to move said locking pin means from the extended to the retracted position thereof, spring means biasing said locking pin means toward the extended position thereof, said means for sensing axial positions of said rod including means sensing movement of said rod into said extended position thereof from said retracted position thereof, said means responsive to said sensing means including means energizing said solenoid motor means and retracting said locking pin means from said first slot to permit rotation of said rod from said extended position thereof to said second circumferential position, and said spring means displacing said locking pin means into said first slot upon rotation of said rod from said second circumferential position to said extended position of said rod.

9. The device of claim 8, wherein said sleeve means includes means defining an end wall spaced from said other end of said rod, said end wall having a non-circular drive socket centrally located therein, said means for rotating said sleeve means including a motor having a non-circular drive shaft received in said socket.

* * * * *